(12) United States Patent
Minamiura

(10) Patent No.: US 8,704,490 B2
(45) Date of Patent: Apr. 22, 2014

(54) CHARGE AND DISCHARGE CONTROL APPARATUS AND CHARGE AND DISCHARGE CONTROL METHOD FOR SECONDARY BATTERY

(75) Inventor: Keiichi Minamiura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 694 days.

(21) Appl. No.: 12/941,170

(22) Filed: Nov. 8, 2010

(65) Prior Publication Data

US 2011/0109274 A1    May 12, 2011

(30) Foreign Application Priority Data

Nov. 12, 2009  (JP) ................................. 2009-258714
Sep. 3, 2010   (JP) ................................. 2010-197685

(51) Int. Cl.
   *H02J 7/00*    (2006.01)
(52) U.S. Cl.
   USPC ............................ 320/134; 320/135; 320/136
(58) Field of Classification Search
   USPC ................................................. 320/134–136
   See application file for complete search history.

(56) References Cited

U.S. PATENT DOCUMENTS 6,133,711 A * 10/2000 Hayashi et al. ............... 320/128

FOREIGN PATENT DOCUMENTS

| JP | 10-108380 | A |   | 4/1998 |
|----|-----------|---|---|--------|
| JP | 11-187577 | A |   | 7/1999 |
| JP | 11187577  | A | * | 7/1999 |
| JP | 2000-092603 | A |   | 3/2000 |
| JP | 2006-094662 | A |   | 4/2006 |
| WO | 2008111594 | A1 |   | 9/2008 |
| WO | 2010005079 | A1 |   | 1/2010 |

OTHER PUBLICATIONS

Office Action issued in JP 2010-197685 on Jan. 10, 2012 and English translation thereof.

* cited by examiner

*Primary Examiner* — Samuel Berhanu
(74) *Attorney, Agent, or Firm* — Kenyon & Kenyon LLP

(57) ABSTRACT

A charge and discharge control apparatus for a secondary battery, which uses feedforward control and feedback control in combination to execute charge and discharge control over the secondary battery, includes: a feedforward control unit that executes the feedforward control; a feedback control unit that executes the feedback control; and a control mode changing unit that changes a control mode between the feedforward control and the feedback control. The feedforward control unit controls at least one of a charging electric power and a discharging electric power on the basis of a predetermined permissible electric power value. When the permissible electric power value is lower than or equal to a predetermined value, the control mode changing unit prohibits the feedforward control, and changes the control mode so as to control at least one of the charging electric power and the discharging electric power through the feedback control.

13 Claims, 5 Drawing Sheets

CHARGE AND DISCHARGE CONTROL APPARATUS AND CHARGE AND DISCHARGE CONTROL METHOD FOR SECONDARY BATTERY

INCORPORATION BY REFERENCE

The disclosure of Japanese Patent Application No. 2009-258714 filed on Nov. 12, 2009, and Japanese Patent Application No. 2010-197685 filed on Sep. 3, 2010, including the specifications, drawings and abstracts, are incorporated herein by reference in their entirety.

BACKGROUND OF THE INVENTION

1. Field of the Invention

The invention relates to a charge and discharge control apparatus and charge and discharge control method for a secondary battery and, more particularly, to a charge and discharge control apparatus and charge and discharge control method for a secondary battery, which use feedforward control and feedback control in combination to execute charge and discharge control.

2. Description of the Related Art

When the state of charge (hereinafter, referred to as SOC) of a secondary battery falls outside an appropriate state and enters an overcharged state or an overdischarged state, performance degradation, or the like, may occur, so charging and discharging is controlled in order to maintain an appropriate SOC. In addition, as in the case of a lithium ion battery, some secondary batteries require strict limiting control over charging current or charging voltage in order to prevent precipitation, or the like, of lithium metal. In addition, in any secondary batteries, for example, in a low-temperature environment, a permissible electric power for charging and discharging is significantly limited in view of performance protection, or the like, so it is necessary to appropriately control charging and discharging electric power in accordance with a battery temperature.

One of charge and discharge control modes of a secondary battery is a control mode that uses feedforward control and feedback control in combination. Feedforward control is, for example, a control mode in which a permissible electric power value corresponding to a battery temperature is set as a target value and then a control signal that implements the target value is unilaterally given. On the other hand, feedback control is, for example, a control mode in which a control parameter, such as a charging voltage, is detected and then a control signal is given in order to reduce a difference between a target value of the control parameter and the detected value of the control parameter. Generally, according to feedforward control, it is possible to maintain a stable charging voltage, or the like; however, it is difficult to sufficiently perform control when an external influence (disturbance) acts on a charge/discharge voltage, or the like. Therefore, in combination with feedback control, for example, a charging voltage is managed so as not to exceed an upper limit voltage value (target value). That is, feedback control is performed while referring to a result, so a variation range of the control parameter increases; however, even when disturbance occurs and appears in a detected value, the detected value may be fed back to manage the target value.

There are proposed some control apparatuses that are intended to achieve high-efficiency charging and discharging in a low-temperature environment. For example, Japanese Patent Application Publication No. 10-108380 (JP-A-10-108380) describes a control apparatus that compares a chargeable depth of charge calculated from a detected battery temperature and a detected charging voltage with a prestored function that uses a battery temperature, a depth of charge and a charging voltage as parameters and that controls a charging electric power to an optimal charging electric power even in any environments (for example, a charging electric power is decreased in a low-temperature environment, and a charging electric power is increased at a normal temperature). In addition, Japanese Patent Application Publication No. 2000-92603 (JP-A-2000-92603) describes an output control apparatus that increases the output limiting value of a battery as the degree of decrease in battery voltage or SOC of the battery increases to thereby increase the degree of output limiting.

The control apparatuses described in JP-A-10408380 and JP-A-2000-92603 vary a charging and discharging electric power in accordance with a battery temperature, or the like, to thereby intend to efficiently perform charging and discharging in response to an environmental variation, or the like; however, those control apparatuses do not consider controllability of charge and discharge operation. That is, as described above, for the secondary battery in a low-temperature environment, a charging and discharging electric power is significantly limited in order to prevent performance degradation, or the like, of the battery; however, it is not easy to accurately control a significantly limited low charging and discharging electric power.

Particularly, in charging a lithium ion battery in a low-temperature environment, there is, for example, a problem that lithium metal easily precipitates on a negative electrode surface, and a charging electric power is further limited as compared with another secondary battery, so it is difficult to accurately control charging electric power. In addition, in an in-vehicle secondary battery that is charged as an engine is driven, when a charging electric power is significantly limited in a low-temperature environment, it is difficult to perform driving control over the engine, so controllability of charging operation deteriorates.

SUMMARY OF INVENTION

The invention provides a charge and discharge control apparatus and charge and discharge control method for a secondary battery, which improves controllability of charging and discharging while sufficiently protecting the performance of the secondary battery in a low-temperature environment.

A first aspect of the invention relates to a charge and discharge control apparatus for a secondary battery, which uses feedforward control and feedback control in combination to execute charge and discharge control over the secondary battery. The charge and discharge control apparatus includes: a feedforward control unit that executes the feedforward control; a feedback control unit that executes the feedback control; and a control mode changing unit that changes a control mode between the feedforward control and the feedback control. The feedforward control unit controls at least one of a charging electric power and a discharging electric power on the basis of a predetermined permissible electric power value. When the permissible electric power value is lower than or equal to a predetermined value, the control mode changing unit prohibits the feedforward control, and changes the control mode so as to control at least one of the charging electric power and the discharging electric power through the feedback control.

With the above aspect, a controlled value, such as a charging electric power, may be stably controlled through feedforward control when the permissible electric power value is high; whereas, controllability of a controlled value may be improved while sufficiently protecting the performance of the secondary battery when the permissible electric power value is limited to a predetermined value or below. That is, when the permissible electric power value is significantly limited and it is difficult to control a charging electric power, or the like, through feedforward control, feedforward control is prohibited, and only a limit value is controlled through feedback control, so it is possible to expand the permissible value of a charging electric power, or the like.

A second aspect of the invention relates to a charge and discharge control method for a secondary battery. The charge and discharge control method includes: executing charge and discharge control over the secondary battery using feedforward control and feedback control in combination, wherein the feedforward control is executed to control at least one of a charging electric power and a discharging electric power on the basis of a predetermined permissible electric power value; and, when the permissible electric power value is lower than or equal to a predetermined value, prohibiting the feedforward control and controlling at least one of the charging electric power and the discharging electric power through the feedback control.

According to the above aspects, it is possible to improve controllability of charging and discharging while sufficiently protecting the performance of a secondary battery in a low-temperature environment.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
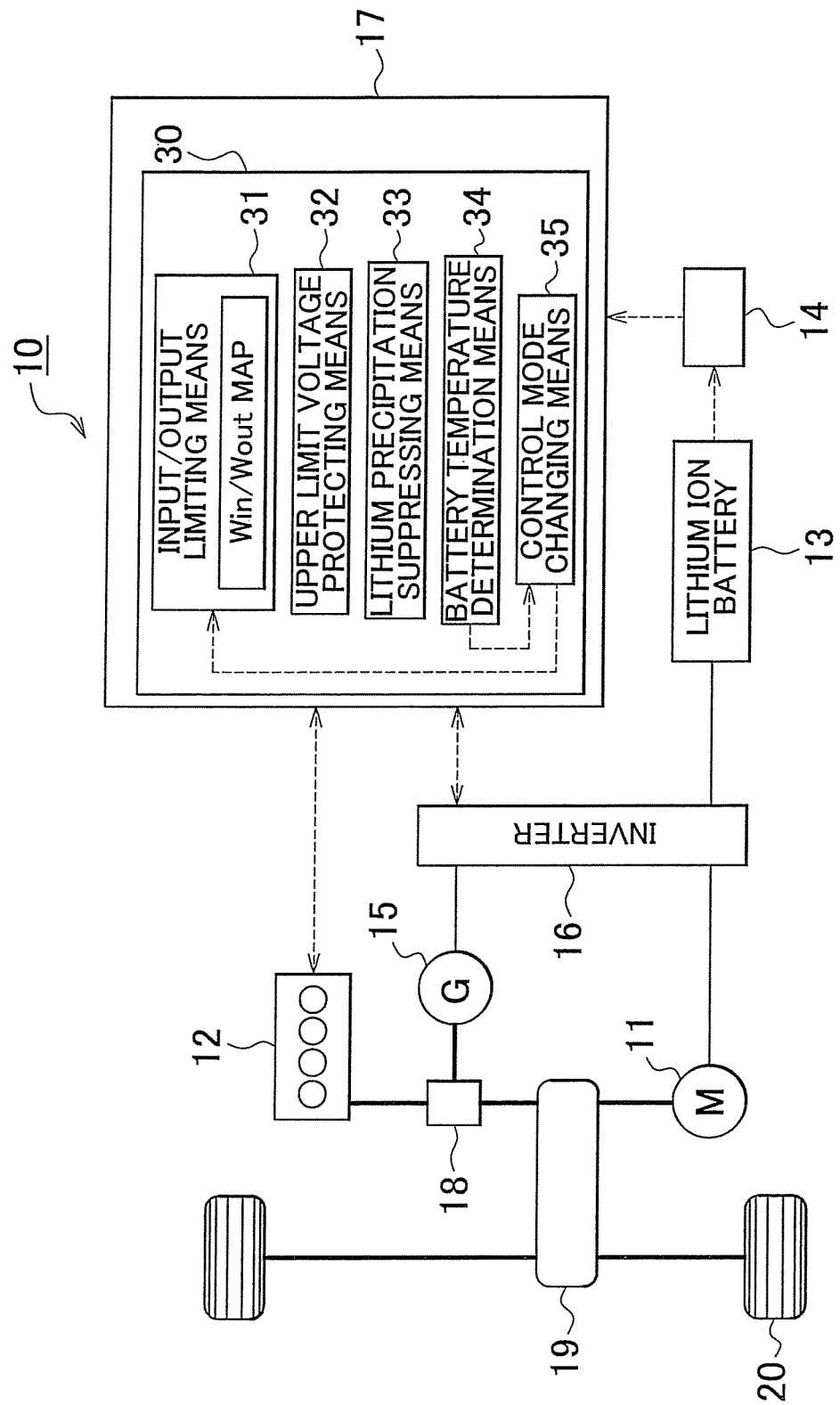
FIG. 1 is a view that shows a charge and discharge control apparatus for a lithium ion battery according to an embodiment of the invention and a hybrid vehicle equipped with the charge and discharge control apparatus.

A charge and discharge control apparatus according to an embodiment of the invention will be described in detail with reference to the accompanying drawings. FIG. 1 shows a charge and discharge control apparatus 30 according to the embodiment of the invention and a hybrid vehicle 10 equipped with the charge and discharge control apparatus 30. Note that, hereinafter, the charge and discharge control apparatus 30 is described as an apparatus that controls charging and discharging of the lithium ion battery 13 equipped for the hybrid vehicle 10. However, a controlled secondary battery and the application of the charge and discharge control apparatus 30 are not limited to the above. For example, the secondary battery may be a nickel-cadmium battery or a nickel-metal hydride battery in addition to the lithium ion battery 13.

As shown in FIG. 1, the hybrid vehicle 10 (hereinafter, referred to as HV vehicle 10) equipped with the charge and discharge control apparatus 30 includes an electric motor 11 and an engine 12 as a driving source of the vehicle. In addition, the hybrid vehicle 10 includes the lithium ion battery 13, a battery monitoring unit 14, a generator 15, an inverter 16, a hybrid control unit 17 (hereinafter, referred to as HV control unit 17), a converter (not shown), and the like. The lithium ion battery 13 is a control object of the charge and discharge control apparatus 30. The battery monitoring unit 14 monitors the state of the lithium ion battery 13. The generator 15 charges the lithium ion battery 13. The inverter 16 converts direct current, supplied from the lithium ion battery 13, into alternating current. The HV control unit 17 comprehensively executes various controls over an HV system. The electric motor 11, the engine 12 and the generator 15 are connected to a reduction gear 19 and drive wheels 20 via a power distribution mechanism 18.

The HV vehicle 10 may be, for example, a parallel/series HV that is a combination of a series HV and a parallel HV. In the series HV, the vehicle is driven by the electric motor 11, and the engine 12 functions as an electric power supply source to the electric motor 11. In the parallel HV, the vehicle is driven by both the electric motor 11 and the engine 12.

In the parallel/series HV, the electric motor 11 mainly serves to assist the engine 12 to output power, and also functions as a generator for regeneration during deceleration. In addition, the engine 12 functions to drive the hybrid vehicle 10 and to drive the generator 15. Generally, the hybrid vehicle 10 runs in an EV mode that uses only the electric motor 11 or in a mode that uses a combination of the electric motor 11 and the engine 12 at the time of start of the vehicle or during low-load driving, and runs in a mode that uses the engine 12 when the speed of the vehicle increases to a certain level. The electric motor 11 and the engine 12 are controlled by the HV control unit 17 that includes the charge and discharge control apparatus 30.

The lithium ion battery 13 has a function of storing electric power generated by the generator 15, or the like, and then supplying the stored electric power to the electric motor 11. The lithium ion battery 13 is a secondary battery that uses a negative electrode made of a carbon material, such as graphite, and a positive electrode made of a lithium compound, such as lithium cobaltate. Lithium ions reversibly migrate between the electrodes to perform charging and discharging. More specifically, as will be described later, in the lithium ion battery 13, the cycle life deteriorates when the charging voltage is excessively high, and lithium metal precipitates on the surface of the negative electrode when the charging current is excessively large, so it is necessary to strictly control the charging voltage and the charging current.

The battery monitoring unit 14 has a function of monitoring the state of the lithium ion battery 13. Specifically, the battery monitoring unit 14 acquires a battery temperature, a voltage value and a current value from sensors (temperature sensor, and the like) (not shown) provided for the lithium ion battery 13, and then transmits the battery temperature, the voltage value and the current value to the charge and discharge control apparatus 30 (HV control unit 17). Then, the charge and discharge control apparatus 30 executes charge and discharge control on the basis of these pieces of information.

The generator 15 is a rotating electrical machine that generates electric power to be supplied to the electric motor 11. The rotary shaft of the generator 15 is coupled to the output shaft of the engine 12 via the power distribution mechanism 18, and is driven by the engine 12. The power distribution mechanism 18 is coupled to the engine 12, the generator 15 and the electric motor 11 and distributes power among them. The power distribution mechanism 18, for example, has a function of distributing driving force generated by the engine 12 between the drive wheels 20 and the generator 15.

The inverter 16 has a function of converting direct current, supplied from the lithium ion battery 13, into alternating current and then supplying the alternating current to the electric motor 11. In addition, the inverter 16 also has a function of converting alternating current, generated by the generator 15 or regenerated by the electric motor 11, into direct current, and the converted direct current is supplied to the lithium ion battery 13. Note that electric power generated by the generator 15 can be directly supplied to the electric motor 11.

Note that various sensors (not shown), such as a rotational speed sensor and a temperature sensor, are provided for the electric motor 11, the engine 12 and the generator 15, and pieces of information detected by those sensors are also transmitted to the charge and discharge control apparatus 30 (HV control unit 17) and mainly used as parameters for feedback control.

The HV control unit 17 includes the charge and discharge control apparatus 30 and comprehensively executes various controls over the HV system. The HV control unit 17 has a function of, for example, executing output control over the electric motor 11 or the engine 12 on the basis of information or signals from various sensors and various electronic control units (ECUs), a driver's output request (accelerator operation amount), and the like. Note that the HV control unit 17 is formed of a microcomputer that includes a CPU, input and output ports, a memory, and the like, and various functions of the HV control unit 17 may be implemented by executing software.

The charge and discharge control apparatus 30 controls charging and discharging of the lithium ion battery 13, and may be configured as part of the HV control unit 17. Particularly, the charge and discharge control apparatus 30 has a function of maintaining a stable charge and discharge characteristic in a mild temperature environment, and particularly improving controllability during charging while sufficiently protecting battery performance in an extremely low-temperature environment. In order to implement the above function, the charge and discharge control apparatus 30 includes input/output limiting means 31 as feedforward control means, upper limit voltage protecting means 32 and lithium precipitation suppressing means 33 as feedback control means, battery temperature determination means 34 and control mode changing means 35.

The input/output limiting means 31 has a function of limiting charging and discharging electric powers on the basis of the temperature of the lithium ion battery 13. In addition, the input/output limiting means 31 has a function of maintaining the SOC at an appropriate value. That is, when the SOC exceeds an upper limit, the input/output limiting means 31 prohibits charging; whereas, when the SOC is lower than a lower limit, the input/output limiting means 31 prohibits discharging. Note that charging is referred to as input, discharging is referred to as output, and, for the sake of convenience, an input value (electric current and electric power) is represented by a negative value and an output value (electric current and electric power) is represented by a positive value.

Here, output limiting control over the lithium ion battery 13 may be mainly executed through output control over the electric motor 11, and input limiting control over the lithium ion battery 13 may be executed through output control over the engine 12. Specifically, output control over the electric motor 11 is executed by controlling the operation of the inverter 16 or the converter (not shown). In addition, input limiting control for regeneration may be executed by, for example, controlling connection and interruption of a main relay (not shown).

The input/output limiting control is executed by the input/output limiting means 31 through feedforward control, and the output of the electric motor 11 and output of the engine 12 are controlled so that an input/output value becomes a target value, not on the basis of a voltage value or a current value. Specifically, the input/output limiting means 31 executes control using a Win/Wout map that defines permissible input/output values (kW) with respect to a battery temperature. That is, the permissible input/output values (kW) of the Win/Wout map are target values of feedforward control, and the input/output limiting means 31 limits input/output so as not to exceed the permissible input/output value (kW).

Figure 2:
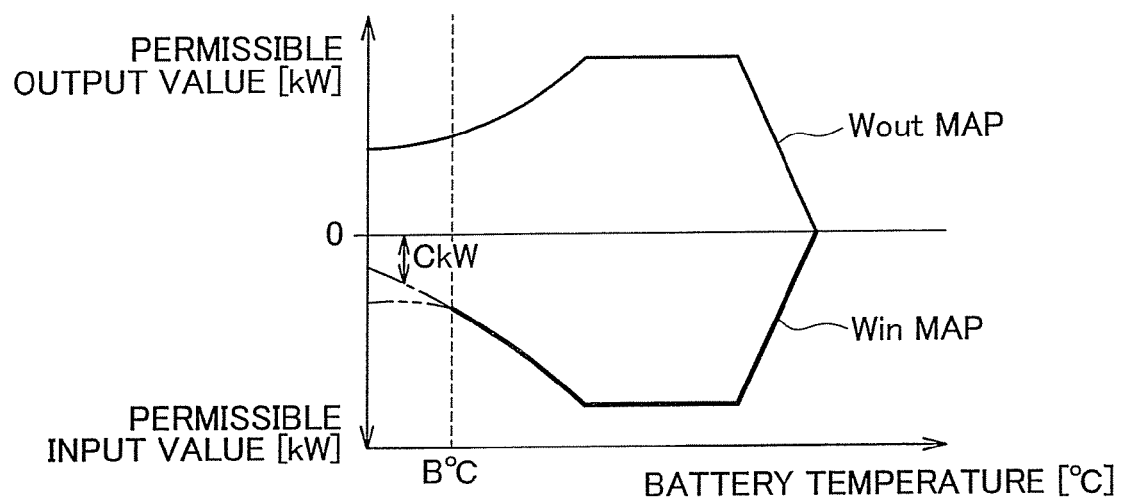
FIG. 2 is a graph that shows a permissible electric power map (Win/Wout map) with respect to a battery temperature in the charge and discharge control apparatus according to the embodiment of the invention.

FIG. 2 shows a Win/Wout map that defines permissible input/output values with respect to a battery temperature. Here, the Win map represents permissible input values (Win) with respect to a battery temperature, and the Wout map represents permissible output values (Wout) with respect to a battery temperature. As shown in FIG. 2, in the Win/Wout map, the permissible input/output values are constant when the battery is in a mild temperature environment, and the permissible input/output values decrease with a decrease in battery temperature. Note that the permissible input/output values decrease when the battery temperature is high as well. Here, Win/Wout is, for example, set to a value that exceeds a limit value (for example, upper/lower limit battery voltage) when input/output continues for a predetermined period of time (for example, A seconds or longer).

Note that the Win/Wout map may be a map that defines permissible input/output values with respect to an SOC. In addition, one axis (X-axis) represents a battery temperature, the other axis (Y-axis) represents an SOC, and then a Win/Wout map may define permissible input/output values with respect to a battery temperature and an SOC. That is, the input/output limiting means 31 may acquire the battery temperature and the SOC and then use the Win/Wout map in which the X-axis represents a battery temperature and the Y-axis represents an SOC to thereby limit input/output.

In the Win map, the alternate long and short dashes line indicates permissible input values of the lithium ion battery 13, and the broken line indicates permissible input values of a nickel-metal hydride battery. In this way, the permissible input values of the lithium ion battery 13 are particularly small values in an extremely low-temperature environment at or below B° C., so it is difficult for the output control over the engine 12 to control such small values (for example, permissible input values at or below C kW). Then, as will be described in detail later, the charge and discharge control apparatus 30 prohibits input limiting control using the Win map in a low-temperature environment in which the battery temperature is lower than or equal to a predetermined temperature (B° C., or the like).

The upper limit voltage protecting means 32 has a function of limiting a charging voltage on the basis of an upper limit charging voltage (hereinafter, referred to as upper limit voltage). As described above, in the lithium ion battery 13, when the charging voltage excessively increases, the cycle life deteriorates. In order to prevent the deterioration in cycle life, an upper limit voltage value is set and then a charging voltage is strictly controlled by the upper limit voltage protecting means 32. The upper limit voltage protecting means 32 acquires a voltage value from the battery monitoring unit 14, and, when the acquired voltage value exceeds the upper limit voltage value (Vlim), decreases the charging voltage so as not to exceed the upper limit voltage value (Vlim). That is, the upper limit voltage protecting means 32 limits the charging voltage on the basis of the measured voltage value, so this control is feedback control.

Figure 3:
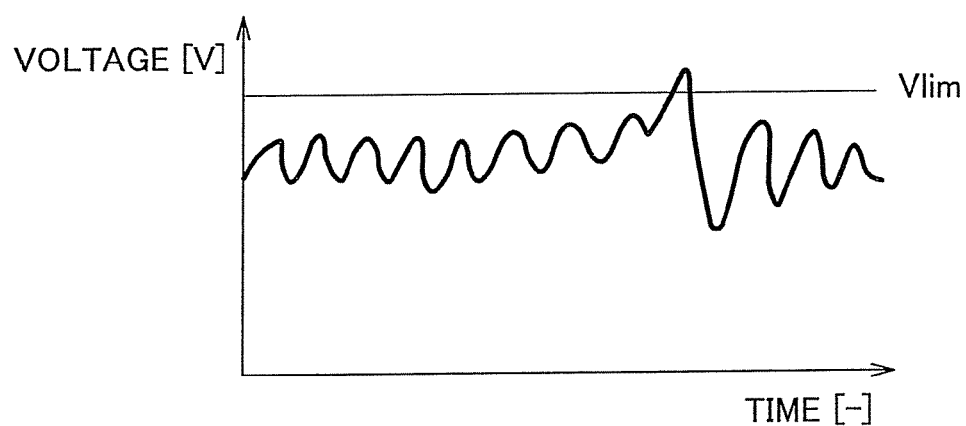
FIG. 3 is a graph that shows an example of an upper limit voltage value and charging voltage values.

FIG. 3 shows an example of the upper limit voltage value (Vlim) and charging voltage values. As shown in FIG. 3, the upper limit voltage value is set at (Vlim), that is, for example, a constant value like 4 V irrespective of a battery temperature, a lapse of charging duration or the like. The charging voltage value is stably maintained through the feedforward control executed by the input/output limiting means 31. However, when the charging voltage value exceeds the upper limit voltage value (Vlim), steep feedback control is exerted, so the charging voltage value abruptly decreases. In this way, although the feedback control lacks in stability of a controlled value, it is possible to control the charging voltage value so as not to exceed the upper limit voltage value (Vlim), which is a limit value. Note that, in order to achieve both control stability and limit value management, feedforward control and feedback control are used in combination.

The lithium precipitation suppressing means 33 has a function of limiting the charging current on the basis of an upper limit charging current (hereinafter, referred to as upper limit current). In the lithium ion battery 13, as the charging current excessively increases, lithium metal precipitates on the negative electrode surface. Therefore, in order to prevent precipitation of lithium metal, the upper limit current value is set and then the charging current is strictly controlled by the lithium precipitation suppressing means 33. The lithium precipitation suppressing means 33 acquires a current value from the battery monitoring unit 14, and, when the acquired current value exceeds the upper limit current value (Ilim), decreases the charging current value so as not to exceed the upper limit current value (Ilim). That is, the lithium precipitation suppressing means 33 executes feedback control in order to limit the charging current value on the basis of the measured current value.

Figure 4:
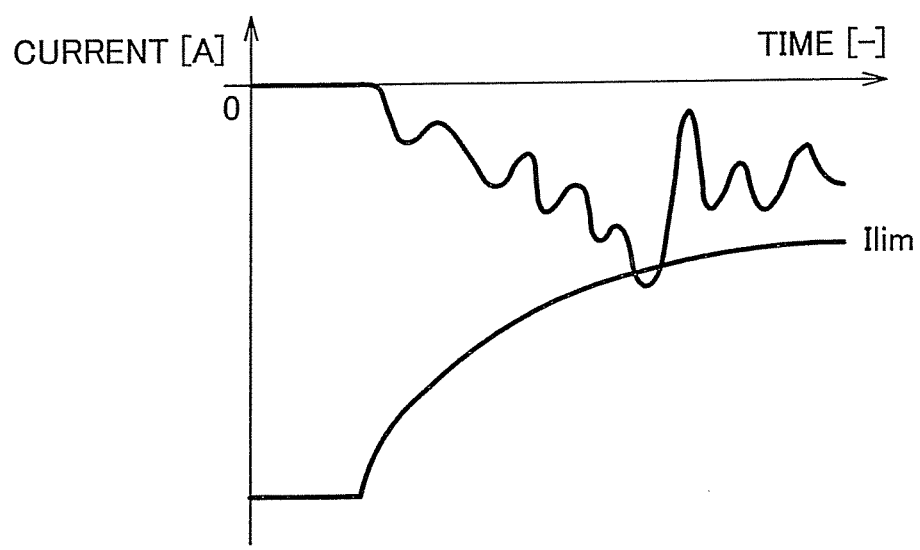
FIG. 4 is a graph that shows a lithium precipitation suppressing control map and an example of charging current values.

FIG. 4 shows a lithium precipitation suppressing control map that defines upper limit current values (Ilim) and an example of charging current values. As shown in FIG. 4, the upper limit current value (Ilim) gradually decreases with the lapse of charging duration. The charging current value is stably maintained through feedforward control executed by the input/output limiting means 31. However, when the charging current value exceeds the upper limit current value (Ilim), steep feedback control is exerted, so the charging current value abruptly decreases.

An upper limit value that corresponds to an accumulated value of charging current (hereinafter simply regarded as accumulated upper limit current value) can be used as the upper limit current value (Ilim). A value that varies proportionally with the accumulated value of charging current may be used as the accumulated upper limit current value. As shown in FIG. 4, when the accumulated value of charging current increases due to the long duration of the charging, the accumulated upper limit current value may proportionally decrease. That is, the lithium precipitation suppressing means 33 calculates (counts) the accumulated value of charging current, and decrease the accumulated upper limit current value based on the calculated accumulated value of charging current. And, when the accumulated value of charging current exceed the accumulated upper limit current value, the charging current value is decreased to a value below the accumulated upper limit current value. The accumulated value of charging current may be reset immediately after the charging of the lithium ion battery 13 has finished. Considering the case in which the lithium ion battery 13 is repeatedly charged and discharged, the accumulated value of charging current may be set, for example, by decreasing the accumulated value of charging current according to duration of stopped time of the battery charging.

Also, the accumulated upper limit current value may be a constant value that does not vary according to the duration of the charging. For example, the lithium precipitation suppressing means 33 calculates the accumulated value of charging current, then when the calculated accumulated value of charging current exceeds the accumulated upper limit current value, that is a constant value, the charging of the lithium ion battery 13 is restricted.

The battery temperature determination means 34 has a function of determining whether the temperature of the lithium ion battery 13 is lower than or equal to a predetermined temperature. Specifically, the battery temperature determination means 34 acquires a battery temperature from the battery monitoring unit 14, and then compares the acquired battery temperature with the predetermined temperature. Here, the predetermined temperature (predetermined value) may be, for example, set at B° C. at which the permissible input value of the Win map is particularly small.

The control mode changing means 35 has a function of prohibiting feedforward control using the Win map when the battery temperature determination means 34 determines that the battery temperature is lower than or equal to the predetermined temperature (for example, lower than or equal to B° C.). That is, input limiting control is not executed by the input/output limiting means 31, and only feedback control is executed by the upper limit voltage protecting means 32 and the lithium precipitation suppressing means 33. Thus, input limitation is carried out on the basis of the upper limit voltage value and the upper limit current value. When the charging voltage value or the charging current value exceeds the corresponding limit value, feedback control is exerted.

Figure 5:
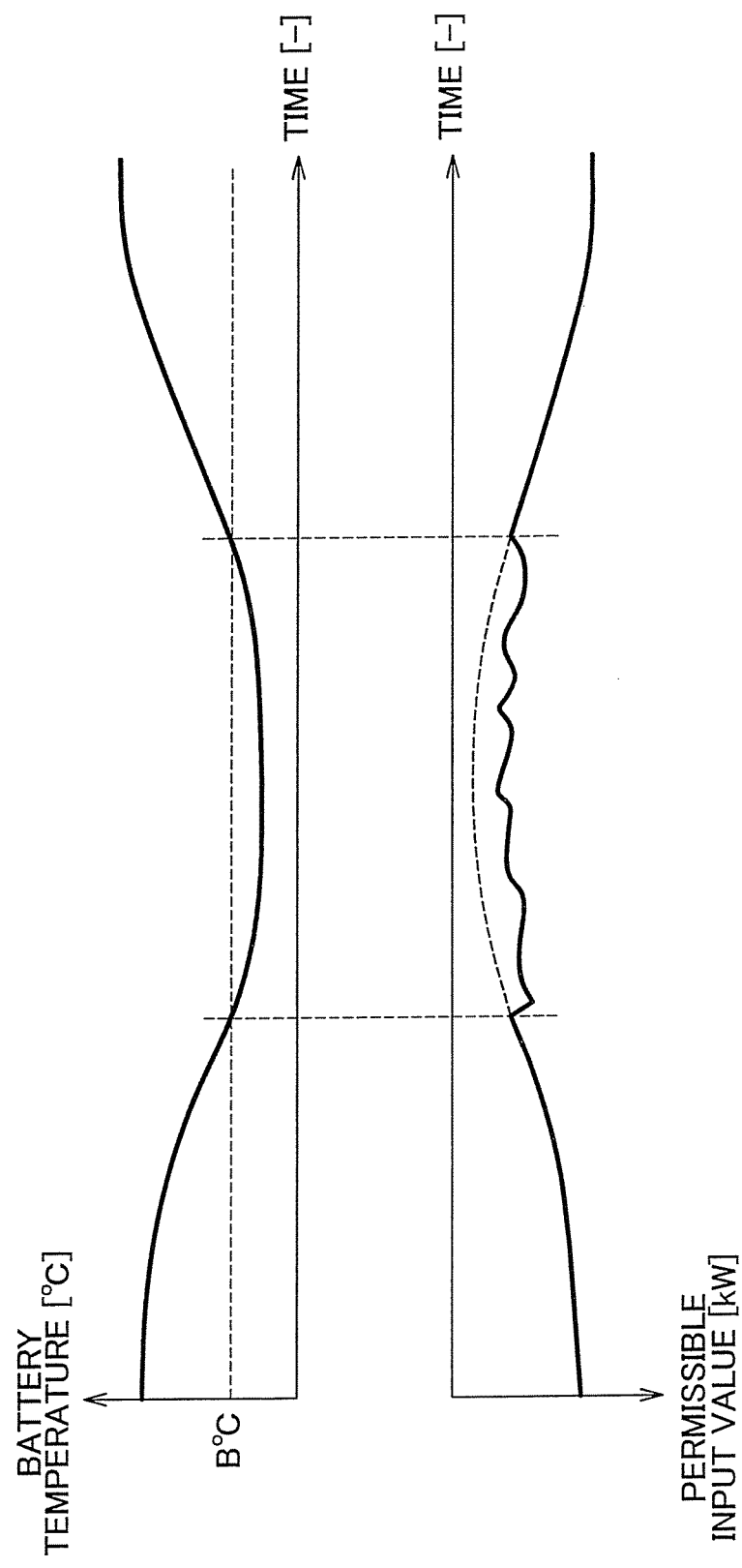
FIG. 5 is a graph that shows an example of a variation in permissible input value in accordance with a battery temperature in charging control over the lithium ion battery, executed by the charge and discharge control apparatus according to the embodiment of the invention.

FIG. 5 shows an example of a variation in permissible input value (Win) in accordance with a battery temperature. As shown in FIG. 5, when the battery temperature exceeds B° C., feedforward control is executed by the input/output limiting means 31, so a variation in permissible input value is gentle. On the other hand, when the battery temperature is lower than or equal to B° C., feedforward control executed by the input/output limiting means 31 is prohibited, and feedback control is executed by the upper limit voltage protecting means 32 and the lithium precipitation suppressing means 33, so a variation in permissible input value is steep. In this way, the charge and discharge control apparatus 30 executes input limiting control through feedforward control when the permissible input value is large, and executes input limiting control only through feedback control when the permissible input value is small because it is difficult to suppress excessive input.

Figure 6:
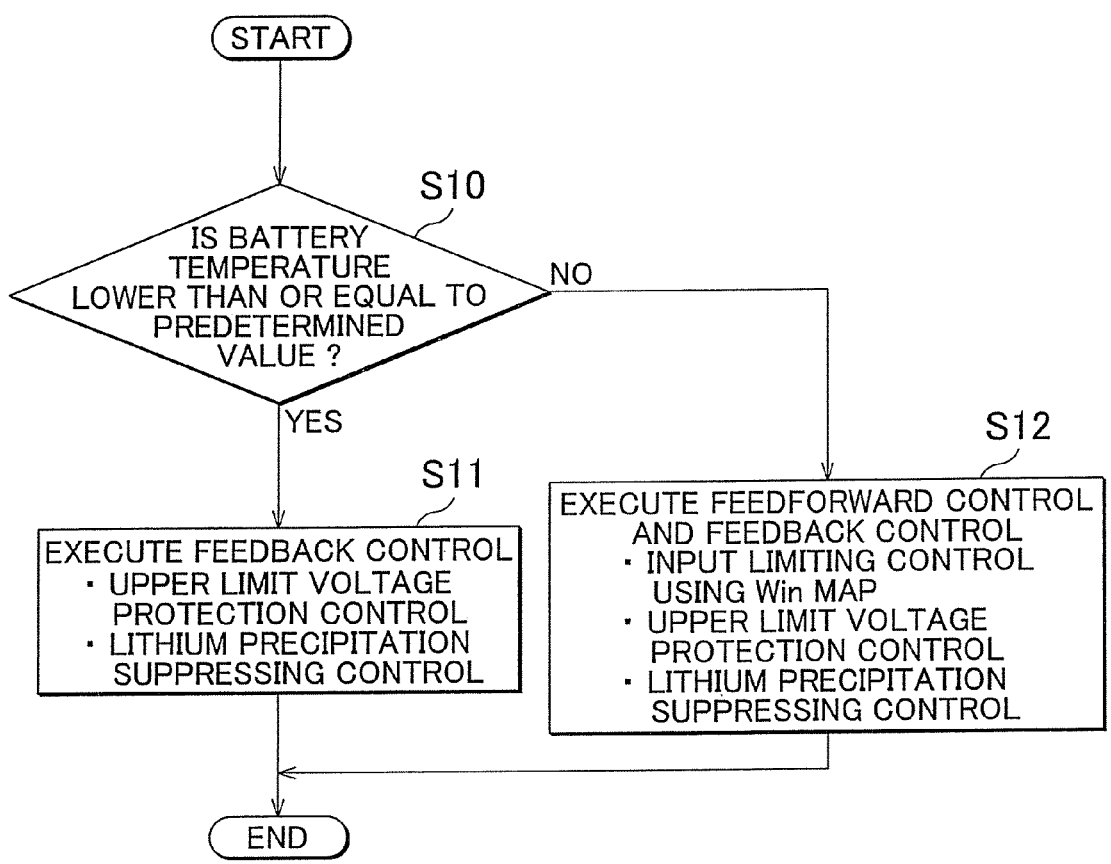
FIG. 6 is a flowchart that shows the procedure of input limiting control over the lithium ion battery, executed by the charge and discharge control apparatus according to the embodiment of the invention.

The operation of the thus configured charge and discharge control apparatus 30, particularly, input limiting control, will be described with reference to FIG. 6. FIG. 6 is a flowchart that shows the procedure of input limiting control over the lithium ion battery 13.

First, it is determined whether the battery temperature of the lithium ion battery 13 is lower than or equal to a predetermined value (for example, lower than or equal to B° C.) (S10). The above procedure is executed by the function of the battery temperature determination means 34. Specifically, the battery temperature determination means 34 compares the battery temperature, acquired from the battery monitoring unit 14, with the predetermined value (predetermined temperature).

When it is determined in S10 that the battery temperature exceeds the predetermined value, feedforward control and feedback control are used in combination to execute input limiting control (S11). That is, the output of the engine 12 is mainly controlled so that the input value does not exceed the permissible input value of the Win map, which corresponds to the battery temperature. Then, when the charging voltage exceeds the upper limit voltage value (see FIG. 3) or the charging current exceeds the upper limit current value (see FIG. 4) because of disturbance, input limitation is executed through feedback control. The above procedure is executed by the functions of the input/output limiting means 31, upper limit voltage protecting means 32 and lithium precipitation suppressing means 33.

On the other hand, when it is determined in S10 that the battery temperature is lower than or equal to the predetermined value, feedforward control is prohibited (S12). That is, input limitation is executed only through feedback control. The control mode is changed by the function of the control mode changing means 35.

As described above, the charge and discharge control apparatus 30 for the lithium ion battery 13 includes the input/output limiting means 31 as feedforward control means (feedforward control unit), the upper limit voltage protecting means 32 and the lithium precipitation suppressing means 33 as feedback control means (feedback control unit), the battery temperature determination means 34 (battery temperature determination unit) and the control mode changing means 35 (control mode changing unit). When the battery temperature determination means 34 determines that the battery temperature is lower than or equal to a predetermined temperature, the control mode changing means 35 prohibits feedforward control that uses the Win map, and executes input limiting control through feedback control. Thus, stable input/output values may be maintained through feedforward control in a mild temperature environment, and controllability of input/output may be improved while sufficiently protecting the performance of the lithium ion battery 13 in an extremely low-temperature environment.

Modification of the above embodiment is described below. The description below describes the features that differ from the above embodiment to omit duplicated explanation.

In the above description, the charge and discharge control apparatus 30 changes the control mode for prohibiting feedforward control in input limiting control over the lithium ion battery 13. However, depending on a controlled secondary battery, changing the control mode may also be applied to output limiting control. In addition, the charge and discharge control apparatus according to the aspect of the invention may be designed to change the control mode only during discharging.

The charge and discharge control apparatus that changes the control mode during discharging may include discharging voltage limiting means that limits a discharging voltage on the basis of a lower limit discharging voltage value and discharging current limiting means that limits a discharging current on the basis of a lower limit discharging current value as feedback control means, and, even when feedforward control is prohibited, for example, it is possible to prevent performance degradation, or the like, due to high-rate discharging.

Also, in the above description, when it is determined that the battery temperature is lower than or equal to a predetermined temperature, the control mode changing means 35 prohibits feedforward control. However, even in a condition other than the condition that the battery temperature is lower than or equal to the predetermined temperature, it is possible to prohibit feedforward control when the permissible electric power value is lower than or equal to a predetermined value. For example, when the SOC is higher than or equal to a predetermined value, the permissible electric power value (permissible charging electric power) is presumably lower than or equal to a predetermined value.

Thus, the control mode changing means is, for example, able to prohibit feedforward control when it is determined in input limiting control that the SOC is higher than or equal to a predetermined value or is able to prohibit feedforward control when it is determined in output limiting control that the SOC is lower than or equal to a predetermined value. That is, the charge and discharge control apparatus according to the aspect of the invention includes SOC determination means in addition to the battery temperature determination means 34 instead of only the battery temperature determination means 34, and is able to change the control mode on the basis of the battery temperature and the SOC.

Furthermore, in the above description, in the lithium precipitation suppressing control, the charging current was described to be the upper limit current value (Ilim) gradually decreases with the lapse of charging duration or to be restricted according to the accumulated upper limit current value corresponds to the accumulated value of charging current. However, for example, in a secondary battery other than lithium ion battery, the charging current may be restricted according to a constant upper limit current value regardless of the duration of the charging or the accumulated value of charging current.

In this invention, the feedforward control means may limit at least one of the charging electric power and the discharging electric power on the basis of a map that defines the permissible electric power value with respect to a battery temperature. The control mode changing means may change the control mode when the battery temperature is lower than or equal to a predetermined temperature.

With this invention, a controlled value, such as a charging electric power, may be stably controlled through feedforward control in a mild temperature environment in which the battery temperature exceeds the predetermined temperature; whereas controllability of the controlled value may be improved while sufficiently protecting the performance of the secondary battery in a low-temperature environment. Note that, in any secondary batteries, as the battery temperature decreases, a permissible electric power for charging and discharging tends to decrease in view of prevention of performance degradation; however, with the above configuration, it is possible to appropriately control a charging and discharging electric power in accordance with a battery temperature.

In this invention, the control mode changing means may change the control mode during charging. The feedback control means may include charging voltage limiting means that limits a charging voltage on the basis of an upper limit voltage value, which is an upper limit of the charging voltage, and charging current limiting means that limits a charging current on the basis of an upper limit current value, which is an upper limit of the charging current.

With this invention, even when the permissible electric power value is significantly limited and feedforward control is prohibited, the charging voltage and the charging current may be controlled so as not to exceed the respective upper limit values, so it is possible to sufficiently protect battery performance. Note that, in the lithium ion battery, in order to prevent performance degradation, it is necessary to strictly limit the charging current and the charging voltage (particularly, when the battery temperature is low, the charging electric power is significantly limited), and the above configuration is suitable when the controlled secondary battery is a lithium ion battery.

In this invention, the control mode changing means may change the control mode during discharging. The feedback control means may include discharging voltage limiting means that limits a discharging voltage on the basis of a lower limit voltage value, which is a lower limit of a discharging voltage, and discharging current limiting means that limits a discharging current on the basis of a lower limit current value, which is a lower limit of a discharging current.

With this invention, even when the permissible electric power value is significantly limited and feedforward control is prohibited, the discharging voltage and the discharging current may be controlled so as not to exceed the respective upper limit values, so it is possible to sufficiently protect battery performance.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A charge and discharge control apparatus for a secondary battery, which uses feedforward control and feedback control in combination to execute charge and discharge control over the secondary battery, comprising:
    a feedforward control unit that executes the feedforward control;
    a feedback control unit that executes the feedback control; and
    a control mode changing unit that changes a control mode between the feedforward control and the feedback control,
    wherein the feedforward control unit controls at least one of a charging electric power and a discharging electric power on the basis of a predetermined permissible electric power value,
    wherein when the permissible electric power value is lower than or equal to a predetermined value, the control mode changing unit prohibits the feedforward control, and changes the control mode so as to control at least one of the charging electric power and the discharging electric power through the feedback control, and
    wherein when the permissible electric power value exceeds the predetermined value, the feedforward control and the feedback control are executed in combination to execute charge and discharge control over the secondary battery.

2. The charge and discharge control apparatus for a secondary battery according to claim 1, wherein:
    the feedforward control unit limits at least one of the charging electric power and the discharging electric power on the basis of a map that defines the permissible electric power value with respect to at least one of a battery temperature and a state of charge; and
    the control mode changing unit changes the control mode when the battery temperature is lower than or equal to a predetermined temperature.

3. The charge and discharge control apparatus for a secondary battery according to claim 2, wherein, when the battery temperature is lower than or equal to the predetermined temperature, the control mode changing unit prohibits the feedforward control and permits the feedback control on the basis of the upper limit voltage value.

4. The charge and discharge control apparatus for a secondary battery according to claim 1, wherein:
    the control mode changing unit changes the control mode during charging; and
    the feedback control unit includes a charging voltage limiting unit that limits a charging voltage on the basis of an upper limit voltage value, which is an upper limit of the charging voltage, and a charging current limiting unit that limits a charging current on the basis of an upper limit current value, which is an upper limit of the charging current.

5. The charge and discharge control apparatus for a secondary battery according to claim 4, wherein, when the battery temperature is lower than or equal to a predetermined temperature, the control mode changing unit prohibits the feedforward control and permits the feedback control on the basis of the upper limit voltage value.

6. The charge and discharge control apparatus for a secondary battery according to claim 1, wherein:
    the control mode changing unit changes the control mode during discharging, and
    the feedback control unit includes a discharging voltage limiting unit that limits a discharging voltage on the basis of a lower limit voltage value, which is a lower limit of a discharging voltage, and a discharging current limiting unit that limits a discharging current on the basis of a lower limit current value, which is a lower limit of a discharging current.

7. The charge and discharge control apparatus for a secondary battery according to claim 6, wherein, when the battery temperature is lower than or equal to a predetermined temperature, the control mode changing unit prohibits the feedforward control, and permits the feedback control on the basis of the lower limit current value.

8. The charge and discharge control apparatus for a secondary battery according to claim 4, wherein the charging voltage limiting unit restricts charging current using an upper limit value that corresponds to an accumulated upper limit of the charging current as the upper limit current value.

9. The charge and discharge control apparatus for a secondary battery according to claim 5, wherein the charging voltage limiting unit restricts charging current using an upper limit value that corresponds to an accumulated upper limit of the charging current as the upper limit current value.

10. The charge and discharge control apparatus for a secondary battery according to claim 6, wherein the charging voltage limiting unit restricts charging current using an upper limit value that corresponds to an accumulated upper limit of the charging current as the upper limit current value.

11. The charge and discharge control apparatus for a secondary battery according to claim 7, wherein the charging voltage limiting unit restricts charging current using an upper limit value that corresponds to an accumulated upper limit of the charging current as the upper limit current value.

12. A charge and discharge control method for a secondary battery, comprising:
  executing charge and discharge control over the secondary battery using feedforward control and feedback control in combination, wherein the feedforward control is executed to control at least one of a charging electric power and a discharging electric power on the basis of a predetermined permissible electric power value,
  when the permissible electric power value is lower than or equal to a predetermined value, prohibiting the feedforward control and controlling at least one of the charging electric power and the discharging electric power through the feedback control, and
  when the permissible electric power value exceeds the predetermined value, executing the feedforward control and the feedback control in combination to execute charge and discharge control over the secondary battery.

13. The charge and discharge control method for a secondary battery according to claim 12, wherein
  the feedforward control and the feedback control each are executed to limit at least one of the charging electric power and the discharging electric power on the basis of a map that defines the permissible electric power value with respect to at least one of a battery temperature and a state of charge,
  the charge and discharge control method further comprising changing a control mode between the feedforward control and the feedback control when the battery temperature is lower than or equal to a predetermined temperature.

* * * * *